United States Patent [19]

Koyanagi

[11] Patent Number: 5,291,486
[45] Date of Patent: Mar. 1, 1994

[54] DATA MULTIPLEXING APPARATUS AND MULTIPLEXED DATA DEMULTIPLEXING APPARATUS

[75] Inventor: Hideki Koyanagi, Kanagawa, Japan

[73] Assignee: Sony Corporation, Tokyo, Japan

[21] Appl. No.: 925,736

[22] Filed: Aug. 7, 1992

[30] Foreign Application Priority Data

Aug. 19, 1991 [JP] Japan .................................. 3-230975
Aug. 19, 1991 [JP] Japan .................................. 3-230976
Aug. 19, 1991 [JP] Japan .................................. 3-230977

[51] Int. Cl.⁵ .............................................. H04J 3/22
[52] U.S. Cl. ......................................... 370/84; 370/112
[58] Field of Search ............... 370/94.1, 60, 112, 94.2, 370/84, 243, 244; 328/153, 154

[56] References Cited

U.S. PATENT DOCUMENTS

| 4,603,416 | 7/1986 | Servel et al. | 370/60 |
| 4,884,264 | 11/1989 | Servel et al. | 370/60 |
| 4,910,731 | 3/1990 | Sakurai et al. | 370/60 |
| 4,947,388 | 8/1990 | Kuwahara et al. | 370/60 |
| 5,099,475 | 3/1992 | Kozaki et al. | 370/60 |

Primary Examiner—Douglas W. Olms
Assistant Examiner—Ajit Patel
Attorney, Agent, or Firm—William S. Frommer; Alvin Sinderbrand

[57] ABSTRACT

Data multiplexing and demultiplexing apparatus for respectively timeshare-multiplexing a plurality of data signals and demultiplexing the timeshared-multiplexed data signals. The multiplexing apparatus includes a plurality of code buffers each respectively receiving one of the data signals, a control circuit for generating switching and header control signals, a switching circuit responsive to the switching control signal for successively retrieving each of the data signals from the code buffers and for grouping the retrieved data signals so as to form respective packets of data and for generating one or more packs of data from the packets of data each having a fixed data length, and a header adding circuit responsive to the header control signal for respectively adding a packet header and a pack header to each packet and pack. The multiplexing apparatus further includes a device for determining if the amount of data to be contained within each pack is less than that which may be contained therein and, upon such determination, for adding data thereto from another packet so as to fill the respective pack, The demultiplexing apparatus includes a header separating circuit for separating the pack and packet headers from the multiplexed data, pack time information storing circuit for storing time information included in each pack header, switching circuit for separating the multiplexed data into the original data signals, and a plurality of buffers each respectively storing one of the data signals from the switching circuit.

13 Claims, 8 Drawing Sheets

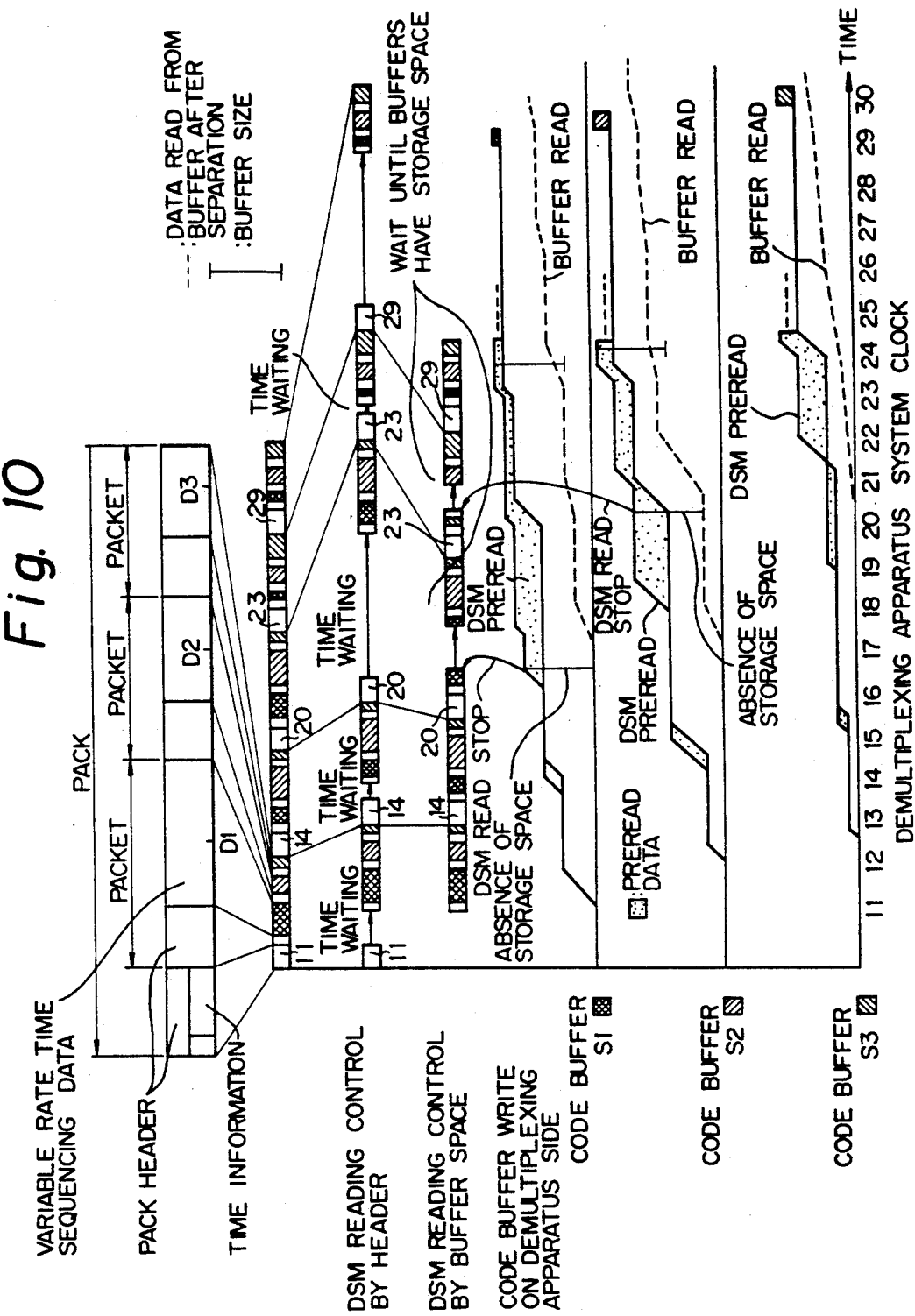

DATA MULTIPLEXING APPARATUS AND MULTIPLEXED DATA DEMULTIPLEXING APPARATUS

BACKGROUND OF THE INVENTION

1. Field of the Invention

The present invention relates to a data multiplexing apparatus for timeshare-multiplexing a plurality of variable rate data and a multiplexed data demultiplexing apparatus for demultiplexing multiplexed data into a plurality of original data.

2. Description of the Prior Art

So far, to timeshare-multiplex a plurality of variable rate time sequencing data (for example, compressed digital moving picture (or sound) data) and to store them on a data storing medium, a plurality of data generated in a particular time of period were grouped together (this grouped data is hereinafter referred to as a pack), a header was added at the beginning of the pack, a code representing a time was written in the header, and thereby, the multiplexed data was generated. To demultiplex the multiplexed data into the original data, the data transfer rate of the data storing medium was adjusted in accordance with the time written at the pack header.

In the above mentioned conventional data multiplexing method, since a plurality of data generated in a particular period of time was grouped together as a multiplexing unit, the data length of the multiplexing unit varied, so that when this multiplexed data was stored on the data storing medium, the multiplexing unit could not be matched with the storing unit of the data storing medium.

OBJECTS AND SUMMARY OF THE INVENTION

Therefore, an object of the present invention is to provide a data multiplexing apparatus wherein the multiplexing unit can be matched with the physical storing unit of the data storing medium.

Another object of the present invention is to provide a multiplexed data demultiplexing apparatus wherein data can be prepared in timeshare-multiplexing a plurality of variable rate data in a multiplexing unit of fixed data length without hindrance.

Still another object of the present invention is to provide a multiplexed data demultiplexing apparatus where a multiplexing apparatus does not need to take care of the fluctuation of delay of data generation in a multiplexing interval.

Further object of the present invention is to provide multiplexed data demultiplexing apparatus in a simple construction for demultiplexing data timeshare- and multiplex-stored on a storing medium into a plurality of original data.

According to an aspect of the invention, there is provided a data multiplexing apparatus for timeshare-multiplexing a plurality of variable rate data, comprising:

controlling means for timeshare-multiplexing the plurality of variable rate data in a multiplexing unit of fixed data length.

In the data multiplexing apparatus mentioned above, since a control means is arranged to timeshare-multiplex a plurality of variable rate data in a multiplexing unit of fixed data length, the multiplexing unit can be matched with the physical storing unit of a data storing medium. As a result, the overhead involved in the storing control of the data storing medium can be reduced.

According to another aspect of the invention, there is provided a multiplexed data demultiplexing apparatus for demultiplexing multiplexed data where a plurality of variable rate data were timeshare-multiplexed in a multiplexing unit of fixed data length into a plurality of original data, comprising:

a plurality of buffers provided in correspondence to the plurality of original data, wherein the plurality of buffers have at least a storage capacity of the multiplexing unit of fixed data length.

In the multiplexed data demultiplexing apparatus mentioned above, since buffers are arranged to store data in a multiplexing unit of fixed data length in the case that a data multiplexing apparatus prereads variable rate data for use in generating a multiplexing unit of fixed data length to generate a pack and a device downstream of the multiplexed data demultiplexing apparatus does not read this data when the pack is separated, even if multiplexed data is stored on a data storing medium and the multiplexed data demultiplexing apparatus is arranged to read the multiplexed data from the data storing medium, the demultiplexing apparatus can read the multiplexed data for example at the maximum transfer rate thereof and thereby no abnormality will take place.

According to still another aspect of the invention, there is provided a multiplexed data demultiplexing apparatus for demultiplexing multiplexed data where a plurality of variable rate data were timeshare-multiplexed in a particular multiplexing interval into a plurality of original data, comprising:

a plurality of buffers for storing the plurality of original data, each of the plurality of buffers having at least the storage capacity equivalent to the maximum data length generated in the multiplexing interval; and delaying means for causing the plurality of buffers to delay read of data from each of the plurality of buffers for the time corresponding to the multiplexing interval.

In the multiplexed data demultiplexing apparatus mentioned above, original data demultiplexed is stored in a buffer having at least the storage capacity equivalent to the maximum data length of data which can be generated in a multiplexing interval and the data demultiplexed is delayed in accordance with the multiplexing interval. Thus, since the multiplexed data demultiplexing apparatus can have a resistance to the fluctuation of delays of data generation in the multiplexing interval, the multiplexing apparatus does not need to consider such fluctuation of delays.

According to further aspect of the invention, there is provided a multiplexed data demultiplexing apparatus for reading a plurality of data which were timeshare- and multiplex-stored on a storing medium and for demultiplexing the read data into a plurality of original data, comprising:

a plurality of buffers provided in correspondence to the plurality of original data;

reading means for reading data stored on the storing medium at a predetermined speed; and controlling means for temporarily stopping the reading operation of the reading means when there is no storage space area in at least one of the plurality of buffers.

According to the multiplexed data demultiplexing apparatus mentioned above, since the controlling means temporarily stops reading data from the storing medium in the case that there is no storage space in any of a plurality of buffers, the reading operation of the storing medium can be controlled in a simple construction. In addition, as long as the buffers have a storage space, the reading operation is continued. As a result, as much data as possible can be prepared from the storing medium.

The above, and other, objects, features and advantage of the present invention will become readily apparent from the following detailed description thereof which is to be read in connection with the accompanying drawings.

BRIEF DESCRIPTION OF THE DRAWINGS

FIG. 10 is a schematic diagram showing an operation of the apparatus of the embodiment shown in FIG. 9 and that of the apparatus shown in FIG. 1.

DETAILED DESCRIPTION OF THE PREFERRED EMBODIMENTS

Figure 1:
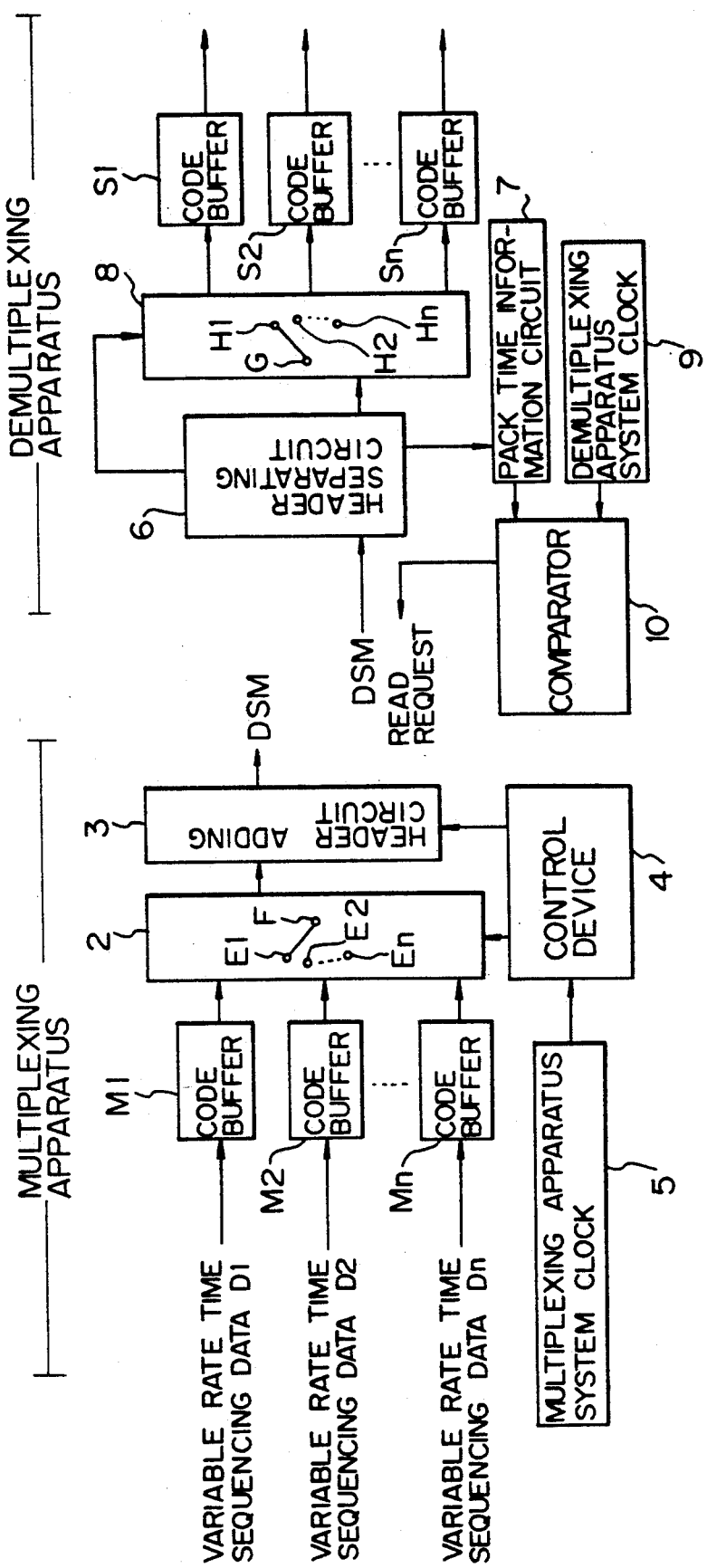
FIG. 1 is a block diagram showing a construction of each embodiment of a data multiplexing apparatus and a multiplexed data demultiplexing apparatus according to the invention.

FIG. 1 is a block diagram showing a construction of each embodiment of a data multiplexing apparatus and a multiplexed data demultiplexing apparatus. For example, variable rate time sequencing data D1, D2, ..., and Dn composed of compressed digital moving picture (Or sound) data are stored in code buffers M1, M2, ..., and Mn of the data multiplexing apparatus. The variable rate time sequencing data contain in itself a synchronization signal, i.e., information with respect to data read intervals for use with a device downstream of a demultiplexing apparatus which will be described later. Output terminals of the code buffers M1, M2, ..., and Mn are connected to input terminals E1, E2, ..., and En of a switching circuit 2. An output terminal F of the switching circuit 2 is connected to an input terminal of a header adding circuit 3. An output of the header adding circuit 3 is sent to a variable rate data storing medium DSM such as an optical disc. The variable rate data storing medium DSM is a storing medium which can always read data at any data transfer rate up to the maximum transfer rate thereof in accordance with a request from the reading side. In the embodiment shown in FIG. 1, the multiplexed data demultiplexing apparatus always reads data from the data storing medium DSM at the maximum transfer rate thereof.

Figure 2:
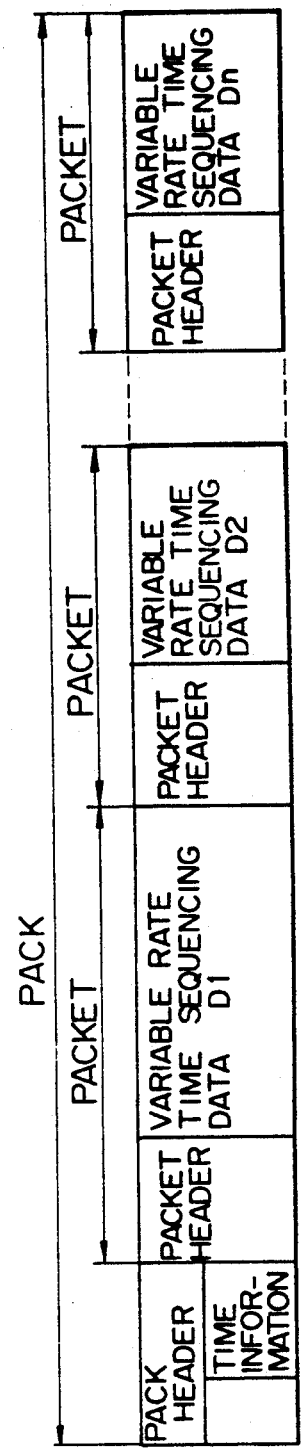
FIG. 2 is a schematic diagram showing an example of a pack generated by the data multiplexing apparatus of FIG. 1.

A control device 4 receives an output of a multiplexing apparatus system clock 5 and connects the input terminals E1, E2, ..., and En of the switching circuit 2 to the output terminal F at a predetermined interval one after the other. Thus, the control device 4 successively and respectively retrieves the variable rate time sequencing data D1, D2, ..., and Dn from the code buffers M1, M2, ..., and Mn and groups the data for each time sequence together. (This grouped data is hereinafter referred to as a packet). In addition, the control device 4 causes the header adding circuit 3 to add a packet header at the beginning of each packet (see FIG. 2). As described above, by slicing in a multiplexing unit of fixed data length a variable length packet train periodically generated, the control device 4 generates a fixed length pack. Moreover, the control device 4 causes the header adding circuit 3 to add a pack header containing time information at the beginning of each pack (see FIG. 2).

When the total data amount of a packet train to be packed is less than the multiplexing unit of fixed data length, the control device 4 waits until the next pack generation time rather than packing the packet train. When the total data amount exceeds the multiplexing unit of fixed data length, which is the data amount of one pack, the control device 4 generates a pack. At this point, one pack contains data of a plurality of times. However, the control device 4 controls the header adding circuit 3 so that the earliest one of the plurality of times is recorded at the pack header. Thus, part of data are sent earlier than the times they have. Although a packet header may be present at the boundary of the pack, the control device 4 may change the order of packets which are sent earlier than the times they have, or, group data having the same time in the pack together so as to prevent the header from being divided. The timeshare-multiplexed data which was packed is sent to the variable rate data storing medium DSM.

A header separating circuit 6 of the multiplexed data demultiplexing apparatus separates a pack header from data being read from the data storing medium DSM and sends the pack header to a pack time information storing circuit 7. In addition, the header separating circuit 6 sends the variable rate time sequencing data D1, D2, ..., and Dn to the input terminal G of the switching circuit 8. The header separating circuit 6 also switches the connection of the input terminal G of the switching circuit 8 and the output terminals H1, H2, ..., and Hn in response to the separation of the packet header from data read from the data storing medium DSM so that the variable rate time sequencing data D1, D2, ..., and Dn are supplied to the code buffers S1, S2, ..., and Sn, respectively, and stored therein.

The pack time information storing circuit 7 stores time information that a pack header contains and sends the time information to one input of a comparator 10.

The comparator 10 receives from the other input terminal thereof an output of the demultiplexing apparatus system clock 9. When the time which is represented with the pack time information storing circuit 7 matches the time which is represented with the system clock 9, the comparator 10 sends a read request to the data storing medium DSM.

As described above, when one pack contains a plurality of data having different times, the control device 4 of the data multiplexing apparatus records the earliest one of the plurality of times at the pack header. Thus, when the multiplexed data demultiplexing apparatus reads a pack from the data storing medium DSM at a time recorded at the pack header to retrieve the multiplexed data within the pack into the original data, since the pack also earlier contains data which should be read at later times, a device downstream of the multiplexed data demultiplexing apparatus does not read this data. As a result, the multiplexed data demultiplexing apparatus cannot continuously read data from the data storing medium DSM at the maximum transfer rate thereof. To prevent this situation, the storage capacity of the code buffers S1, S2, ..., and Sn is equivalent to the fixed data length of multiplexed data, namely the data amount equivalent to one pack. This is because the amount of data which is earlier sent than the time at which it should be sent does not exceed the data amount of one pack at most.

In the multiplexed data demultiplexing apparatus as shown in FIG. 1, the initial time of the system clock 9 is set to time represented with the header of the first pack. Thus, the comparator 10 outputs a read request to the data storing medium DSM. Accordingly, the variable rate time sequencing data D1, D2, ..., and Dn contained in the first pack are sent from the data storing medium DSM to the switching circuit 8 through the header separating circuit 6. The switching circuit 8 switches the variable rate time sequencing data D1, D2, ..., and Dn to the code buffers S1, S2, ..., and Sn, respectively On the other hand, the header separating circuit 6 outputs the pack header of a pack preceded by the first pack to the pack time information storing circuit 7. The storing circuit 7 stores the time information contained in the pack header. When the time represented with the system clock 9 matches the time stored in the storing circuit 7, the comparator 10 outputs a read request to the data storing medium DSM. Thus, the variable rate time sequencing data D1, D2, ..., and Dn contained in the pack preceded by the first pack are sent from the data storing medium DSM to the switching circuit 8 through the header separating circuit 6. In such a manner, the variable rate time sequencing data D1, D2, ..., and Dn divided into a plurality of packs are stored in the code buffers, S1, S2, ..., and Sn, respectively and retrieved into the original variable rate time sequencing data D1, D2, ..., and Dn.

Figure 3:
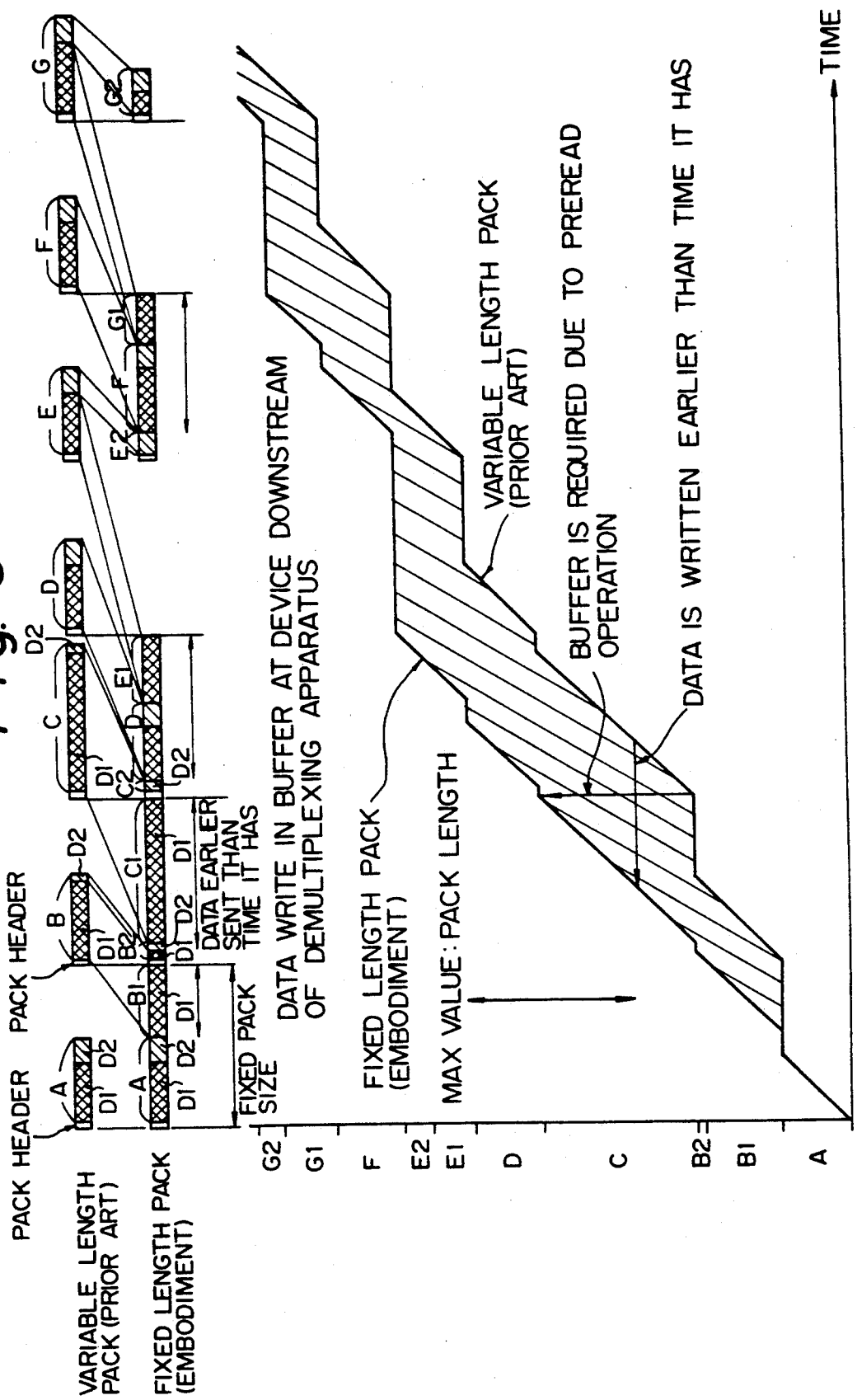
FIG. 3 is a schematic diagram describing an example of operation of the embodiment of FIG. 1.

Next, with reference to FIG. 3, the operation of the embodiment shown in FIG. 1 will be described. In FIG. 3, it is assumed that there are two channels to be time-share-multiplexed for simplicity. In other words, in the figure, there are two variable rate time sequencing data D1 and D2 as opposed to FIG. 1. In this case, the multiplexing apparatus side has two code buffers M1 and M2, while the demultiplexing apparatus side has two code buffers S1 and S2. The control device 4 of the data multiplexing apparatus generates the first pack by the use of a part B1 of packet train B which was conventionally contained in the second pack as well as packet train A. Thereafter, the control device 4 sends the first pack to the data storing medium DSM. Next, the control device 4 generates a second pack of fixed data length by the use of part A1 of packet train C which was conventionally contained in the third pack as well as remaining part B2 of packet train B. Then, the control device 4 sends the second pack to the data storing medium DSM. Thereafter, the control device 4 generates a third pack of fixed data length by the use of all the pack train D which was conventionally contained in the fourth pack as well as part E1 of packet train E which was conventionally contained in the fifth pack. Next, the control device 4 sends the third pack to the data storing medium DSM. In the subsequent pack generation period, the control device 4 does not generate a pack. Thereafter, the control device 4 generates a fourth pack of fixed data length by the use of remaining part E2 of packet train E, all the packet train F which was conventionally contained in the sixth pack, and part G1 of the packet train G which was conventionally contained in the seventh pack. Then, the control device 4 sends the fourth pack to the data storing medium DSM. In such a manner, the packs of fixed data length are generated in succession and then sent to the data storing medium DSM.

As described above, since the data length of packs generated by the multiplexing apparatus of FIG. 1 is fixed, this data length can be matched with the physical storing unit of the data storing medium DSM. Thus, the overhead involved in the storing control can be decreased. In addition, when data is reproduced from the data storing medium at random, the waiting time can be reduced. Moreover, data search and intermittent reproduction can be performed at high speeds.

The lower half of FIG. 3 represents variation of storage amount of the code buffer S1 of the demultiplexing apparatus with hatched lines. As described above, data which has a later time than it is actually read is written to the code buffer S1. However, since the storage capacity of the code buffer S1 is equal to the multiplexing unit of fixed data length, which is the data amount of one pack, no problem will take place.

In the above mentioned embodiment, the storage capacity of the code buffers S1, S2, ..., and Sn of the demultiplexing apparatus was the multiplexing unit of fixed data length, which is the data amount of one pack, the storage capacity can be larger than the data amount of one pack. However, from size and cost points of view, the storage capacity is preferably the data amount of one pack.

In the above mentioned embodiment, an optical disc was used as a data storing medium. However, it should be understood that magnetooptical disc, a magnetic hard disc, a digital audio tape, or the like can be used.

Figure 5:
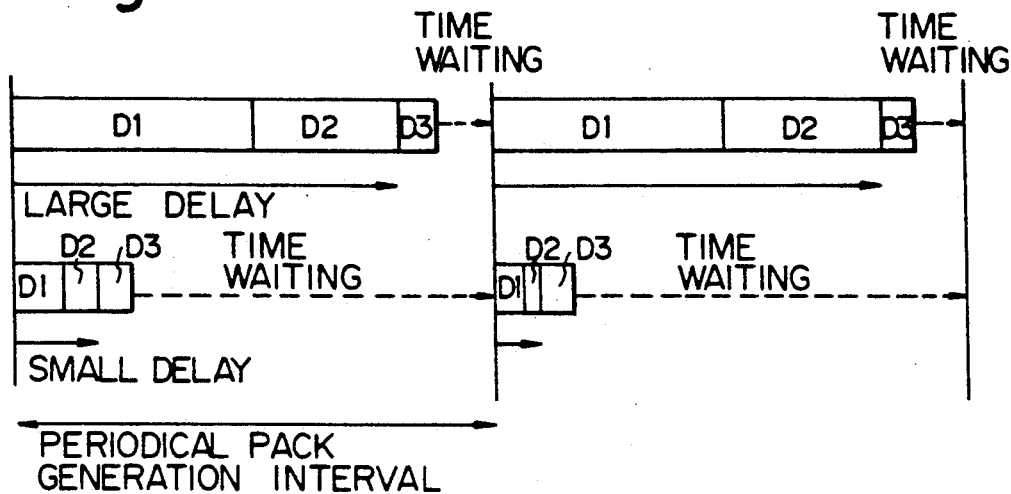
FIG. 5 is a schematic diagram showing a fluctuation of delay of data generation in a multiplexing interval or a pack generation interval.
Figure 6:
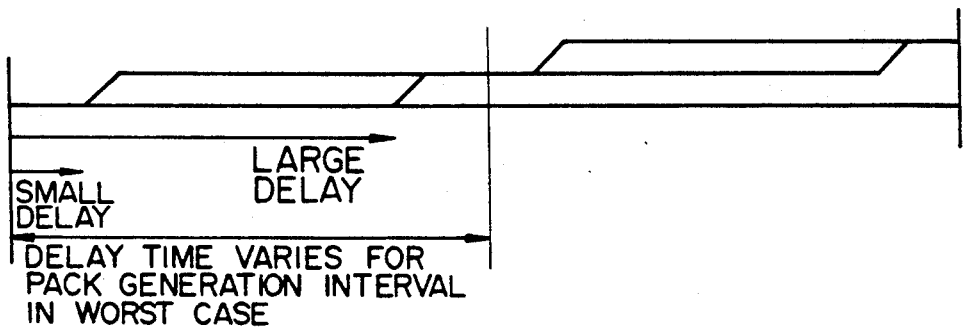
FIG. 6 is a schematic diagram showing the fluctuation of read timing of time sequencing data from the demultiplexing apparatus due to fluctuation of delay involved in data generation in a multiplexing interval or a pack generation interval.

In the conventional data multiplexing method mentioned previously, when the plurality of variable rate time sequencing data are denoted D1, D2, and D3, the generation delay time which takes place in a pack of D3 significantly varies depending on the data lengths of D1 and D2 as shown in FIG. 5. Thus, the timing at which D3 is read from the multiplexed data demultiplexing apparatus, which demultiplexes multiplexed data, into plurality of original data D1, D2, and D3, remarkably fluctuates as shown in FIG. 6.

Figure 8:
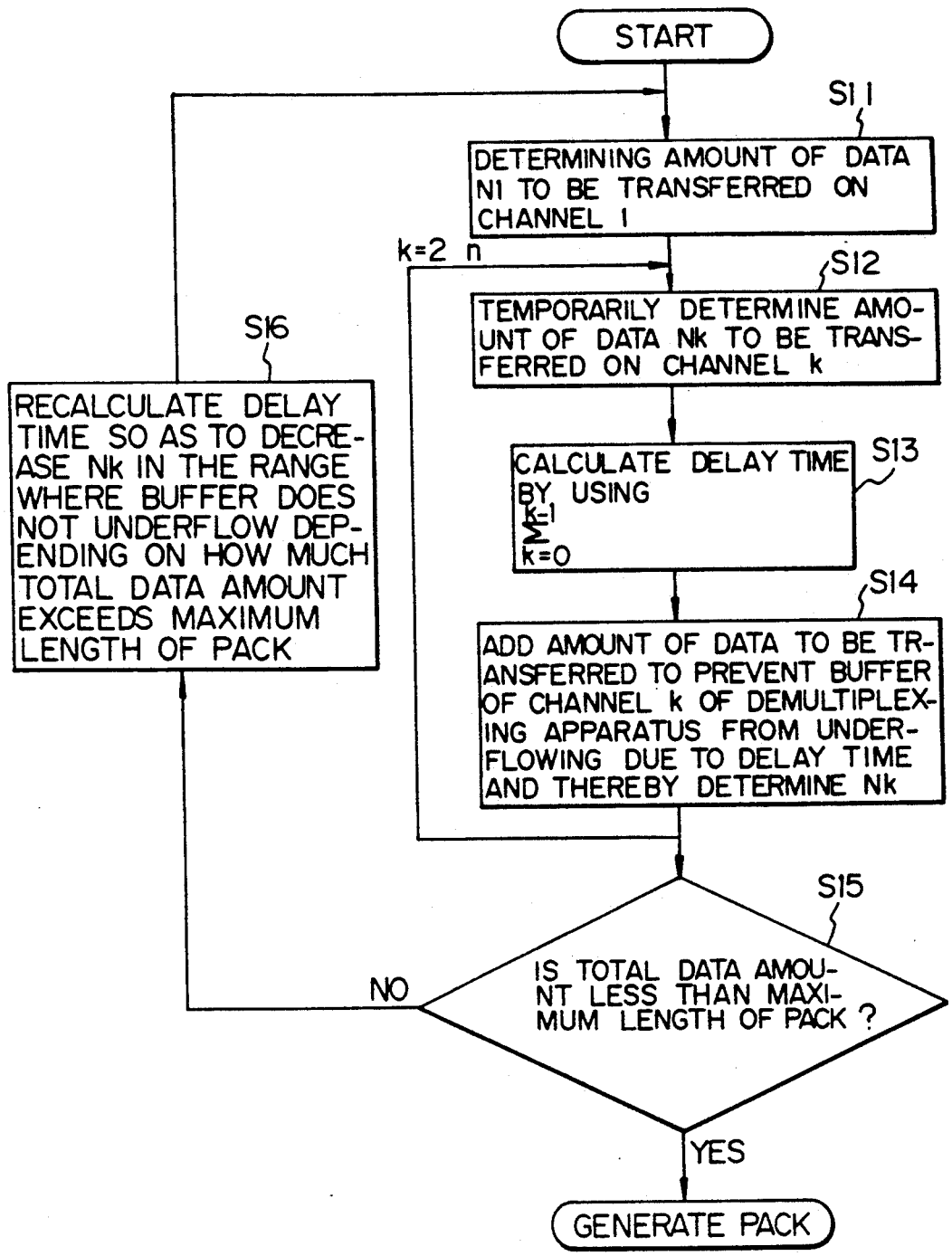
FIG. 8 is a flow chart showing an example of a process of a conventional data multiplexing apparatus for dealing with the fluctuation of delay involved in data generation in the multiplexing interval or pack generation interval.

FIG. 8 is a flow chart showing a process that the multiplexing apparatus performs to prevent underflow from taking place in the multiplexed data demultiplexing apparatus due to a delay of data generation in the pack. In this example, the number of channels on which data is timeshare-multiplexed is n, that is, the number of variable rate time sequencing data is n. First, the amount of data to be transferred on channel 1, N1, is determined (in step S11). Then, the amount of data to be transferred on channel 2, N2, is temporarily determined (in step S12). Thereafter, the delay time of the data of channel 2 is calculated by the use of the total amount of data transferred on the channel preceded by channel 2 (in step S13). Thereafter, depending on the calculated delay time, the amount of data to be transferred is added in such a way that the buffer of channel 2 on the demultiplexing apparatus side does not overflow. Thus, the amount of data to be transferred on channel, N2, is determined (in step S14). Thereafter, the process from steps S12 to S14 is repeated and thereby the amounts of data to be transferred on channels 3 to n, N3 to Nn, are determined. Thereafter, it is determined whether or not the total amounts of data to be transferred, N1 to Nn, are within the maximum data length (in step S15). When the total amount of data does not exceed the maximum data length, recalculation is performed so that depending on how much the total amount of data to be transferred, N1 to Nn, exceeds the maximum data length of the pack, the amount of data on each channel, Nk, is decreased in such a way that each buffer of the demultiplexing apparatus does not overflow.

However, in the process that the multiplexing apparatus shown in FIG. 8 performs, since the time sequencing data of each channel to be processed is of a variable rate, the delay time of data generation in the multiplexing interval varies from interval to interval. Thus, the process becomes complicated.

The above mentioned problem can be solved by another embodiment of the invention.

Figure 4:
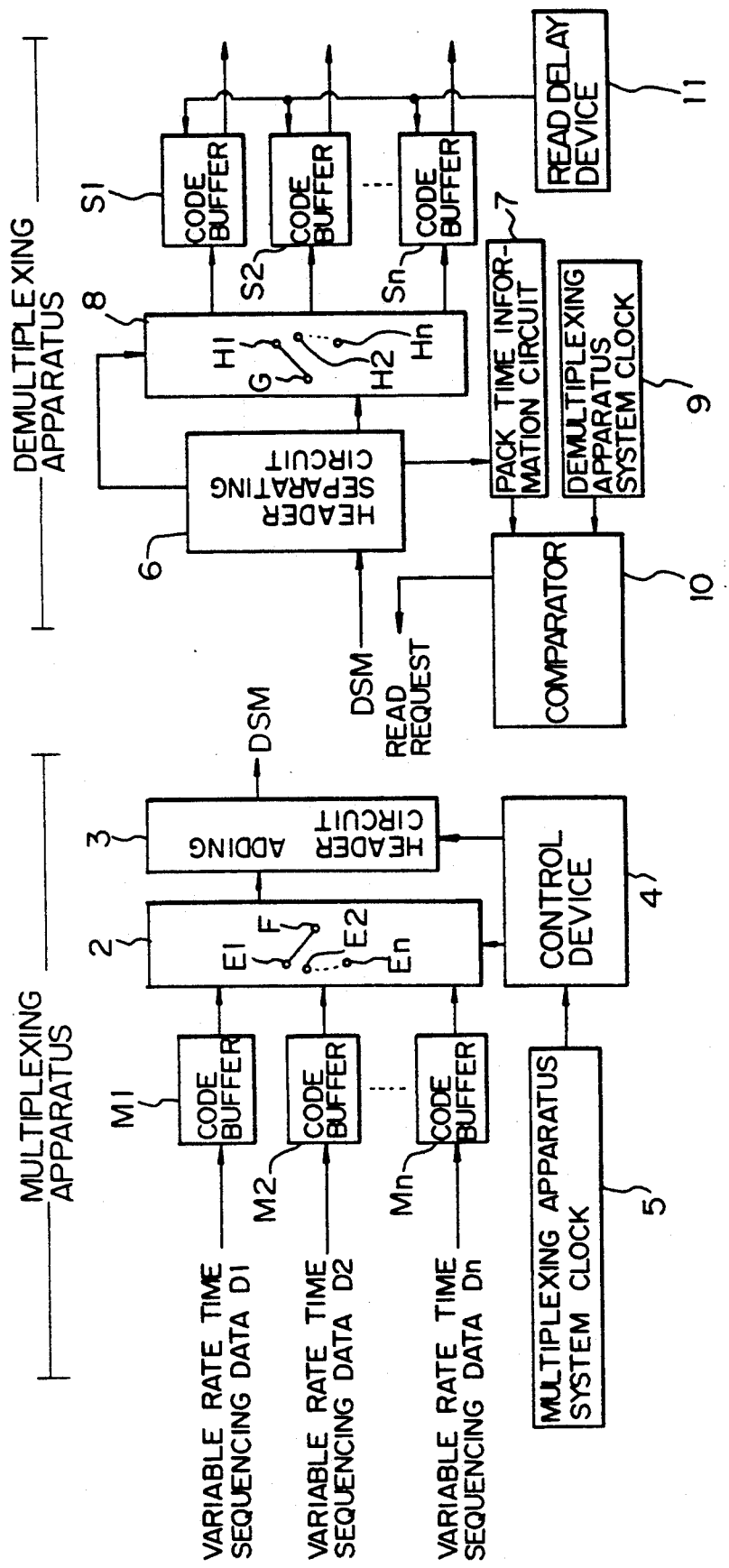
FIG. 4 is a block diagram showing a construction of another embodiment of a multiplexed data demultiplexing apparatus according to the invention as well as that of a multiplexing apparatus.

FIG. 4 is a block diagram showing a construction of another embodiment of a multiplexed data demultiplexing apparatus as well as that of a multiplexing apparatus. variable rate time sequencing data D1, D2, . . . , and Dn composed of for example compressed digital moving picture (or sound) data are stored in code buffers M1, M2, . . . , and Mn of a multiplexing apparatus. Each variable rate time sequencing data contain in itself a synchronization signal i.e., information with respect to a data read interval for use with a device downstream of a demultiplexing apparatus which will be described later. Output terminals of the code buffers M1, M2, . . . , and Mn are connected to input terminals E1, E2, . . . , and En of a switching circuit 2, respectively. An output terminal F of the switching circuit 2 is connected to an input terminal of a header adding circuit 3. An output of the header adding circuit 3 is sent to a variable rate data storing medium DSM such as an optical disc. The variable rate data storing medium DSM is a storing medium which can always read data at any rate of up to the maximum transfer rate thereof in accordance with a request of the reading side. In the embodiment shown in FIG. 4, the multiplexed data demultiplexing apparatus side always reads data from the data storing medium DSM at the maximum transfer rate thereof.

A control unit 4 receives an output of a multiplexing apparatus system clock 5 and connects the input terminals E1, E2, . . . , and En of the switching circuit 2 to the output terminal F at a particular interval one after the other. Thus, the control unit 4 retrieves the variable rate time sequencing data D1, D2, . . . , and Dn from the code buffers M1, M2, . . . , and Mn, respectively and groups the variable rate data of each time sequence together. In addition, the control unit 4 causes the header adding circuit 3 to add a packet header at the beginning of each packet (see FIG. 2). Moreover, the control unit 4 groups the packets of all the time sequences together. Thereafter, the control unit 4 causes the header adding circuit 3 to add at the beginning of each pack a pack header containing time information for use in reading the pack (see FIG. 2). The timeshare-multiplexed data with a pack header is sent to the variable rate data storing medium DSM.

A header separating circuit 6 of the multiplexed data demultiplexing apparatus separates a pack header from data being read from the data storing medium DSM and sends the pack header to a pack time information storing circuit 7. In addition, the header separating circuit 6 sends the variable rate time sequencing data D1, D2, . . ., and Dn to an input terminal G of a switching circuit 8. The header separating circuit 6 also switches the connection of the input terminal G of the switching circuit 8 and the output terminals H1, H2, . . . , and Hn in response to the separation of the packet header from data read from the data storing medium DSM so that the variable rate time sequencing data D1, D2, . . . , and Dn are supplied to the code buffers S1, S2, . . . , and Sn respectively, and stored therein.

The pack time information storing circuit 7 stores time information contained in a pack header and sends this information to one input of a comparator 10. In addition, the comparator 10 receives from the other input thereof an output of the demultiplexing apparatus system clock 9. When the time represented with the output of the pack time information storing circuit 7 matches the time represented with the system clock 9, the comparator 10 sends a read request to the data storing medium DSM.

As described with reference to FIG. 5, a multiplexing interval of a plurality of variable rate time sequencing data D1, D2, . . . , and Dn, which is a generation delay time which takes place in a pack remarkably varies depending on the length of data which precedes thereof. Thus, as described with reference to FIG. 6, the timing for reading the plurality of variable rate time sequencing data D1, D2, . . ., and Dn retrieved from the code buffers S1, S2, . . . , and Sn of the multiplexed data demultiplexing apparatus remarkably varies. Consequently, when the multiplexing apparatus directly sends multiplexed data to the demultiplexing apparatus, the data varies for the multiplexing interval, which is the pack generation interval, in the worst case. On the other hand, in the case of the embodiment shown in FIG. 4, when multiplexed data is transferred from the data storing medium DSM to the demultiplexing apparatus, the multiplexed data varies for the time where the data length of a pack is divided by the data transfer rate of the data storing medium DSM (or by the maximum transfer rate when data is transferred at the maximum transfer rate). Thus, in the embodiment shown in FIG. 1, so as to read data from the code buffers S1, S2, . . . , and Sn even in the worst case, a read delay device 11 for delaying data which is read from the code buffers S1, S2, . . . , and Sn for the time where the data length of the pack is divided by the data transfer rate of the data storing medium DSM (or by the maximum transfer rate when the data is transferred at the maximum transfer rate). In addition, the code buffers S1, S2, . . . , and Sn have the capacity of the maximum data length which can be generated in the multiplexing interval.

In the multiplexed data demultiplexing apparatus shown in FIG. 4, the initial time of the system clock 9 is set to the time represented with the header of a first pack. Thus, the comparator 10 sends a read request to the data storing medium DSM. Accordingly, the data storing medium DSM transfers the variable rate time sequencing data D1, D2, . . . , and Dn contained in the first pack to the multiplexed data demultiplexing apparatus at the maximum transfer rate thereof. The multiplexed data demultiplexing apparatus sends the data to the switching circuit 8 through the header separating circuit 6. The switching circuit 8 switches the variable rate time sequencing data D1, D2, . . . , and Dn to the code buffers S1, S2, . . . , and Sn, respectively. On the other hand, the header separating circuit 6 outputs the pack header of the pack preceded by the first pack to the pack time information storing circuit 7. The storing circuit 7 stores time information contained in the pack header. When the time represented with the system clock 9 matches the time stored in the storing circuit 7, the comparator 10 outputs a read request to the data storing medium DSM. Accordingly, the variable rate time sequencing data D1, D2, . . . , and Dn contained in the pack preceded by the first pack is sent from the data storing medium DSM to the switching circuit 8 through the header separating circuit 6. The switching circuit 8 switches these data to the code buffers S1, S2, . . . , and Sn, respectively. Consequently, the variable rate time sequencing data D1, D2, . . . , and Dn divided into a plurality of packs are stored in the code buffers S1, S2, . . . , and Sn, respectively and then the original variable rate time sequencing data D1, D2, . . . , and Dn are obtained.

Figure 7:
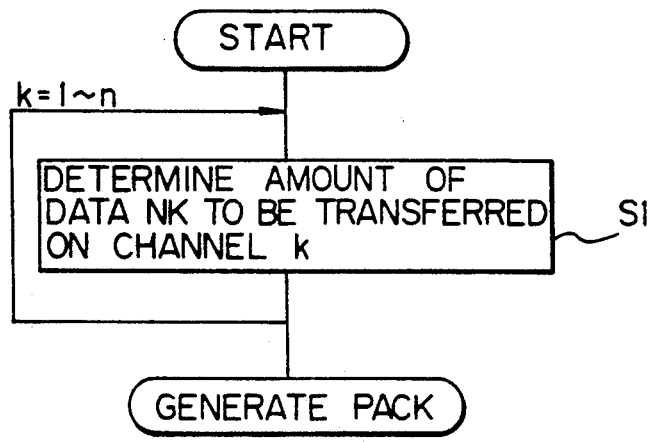
FIG. 7 is a flow chart showing an example of operation of data multiplexing apparatus of the embodiment of the multiplexed data demultiplexing apparatus of FIG. 4.

The original data D1, D2, . . . , and Dn obtained are stored in the code buffers S1, S2, . . . , and Sn having the capacity of the maximum data length of data which can be generated in the multiplexing interval. The read delay device 11 delays the data for the period of time where the data length of the pack is divided by the maximum transfer rate of the data storing medium DSM. Thus, the demultiplexing apparatus can have a resistance to the fluctuation of delay of data generation in the multiplexing interval. As a result, without necessity of considering the fluctuation of delay on the multiplexing apparatus side, as shown in step S1 of FIG. 7, the control unit 4 of the multiplexing apparatus may only determine each transfer data amount Nk of the variable rate time sequencing data D1, D2, . . . , and Dn corresponding to the channels 1 to n.

In the embodiment as just described, the storage capacity of the code buffers S1, S2, . . . , and Sn of the demodulating apparatus was the maximum data length which can be generated in a multiplexing interval. However, it should be understood that the storage capacity of these code buffers can be larger than the maximum data length. However, from the view points of the size and cost of the apparatus, the storage capacity of the code buffers is preferably the maximum data length which can be generated in a multiplexing interval.

In the multiplexed data demultiplexing apparatus of FIG. 1, time information should be written to each pack header. In addition, since this apparatus requires the time information storing circuit 7 and the comparator 10, the construction thereof is a little complicated.

The above mentioned problem can be solved by still another embodiment of the invention.

Figure 9:
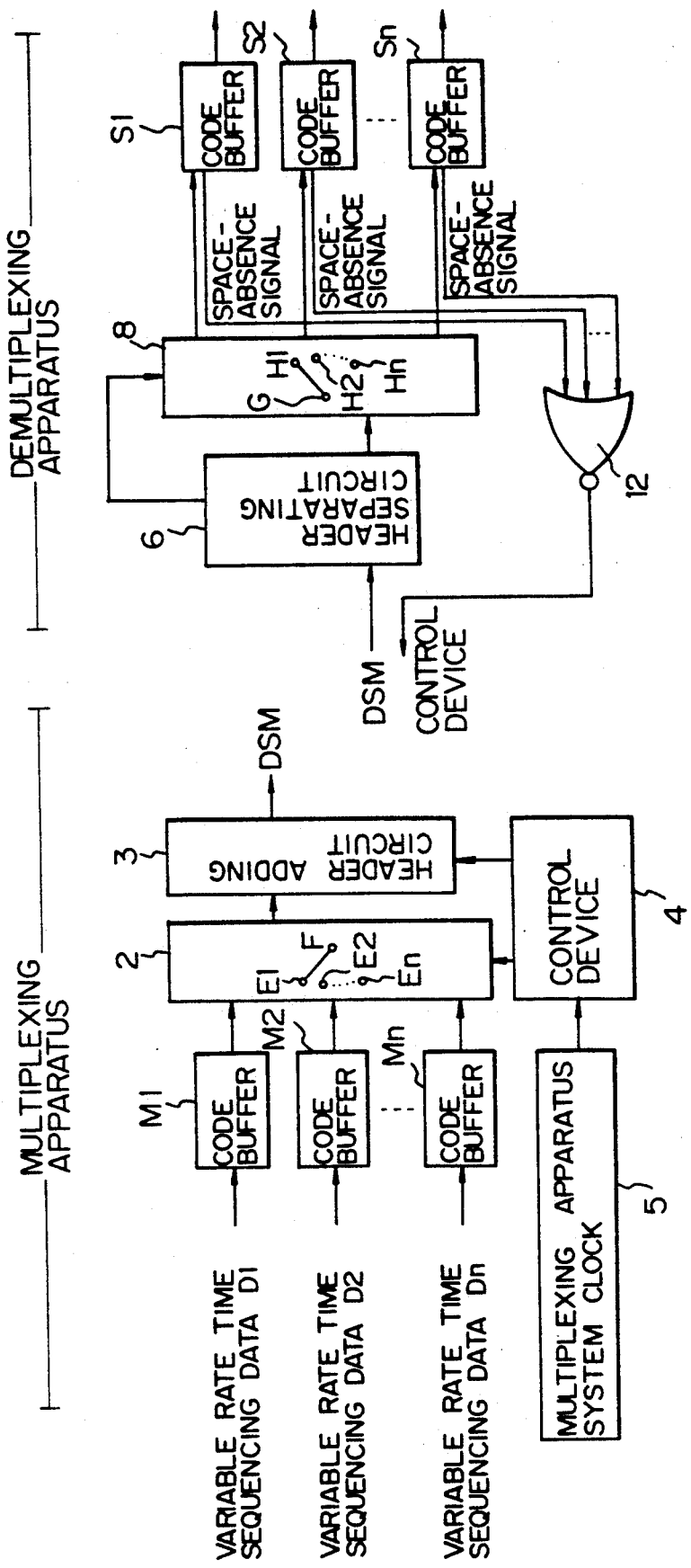
FIG. 9 is a block diagram showing a construction of still another embodiment of a multiplexed data demultiplexing apparatus according to the invention as well as that of a multiplexing apparatus.

FIG. 9 shows a construction of still another embodiment of a multiplexed data demultiplexing apparatus in accordance with the present invention. In FIG. 9, the same parts as those in FIG. 1 are represented with the same reference numerals. In other words, since each construction and operation of the code buffers M1, M2, . . . , and Mn, the switching circuit 2, the header adding circuit 3, the variable rate data storing medium DSM, the control unit 4, the multiplexing unit system clock 5, the header separating circuit 6, the switching circuit 8, and the code buffers S1, S2, . . . , and Sn of FIG. 9 are the same as those of FIG. 1, their description will be omitted.

In the embodiment of FIG. 9, an NOR gate 12 having n input terminals connected to code buffers S1, S2, . . . , and Sn constructs a reading control means of the data storing medium DSM. In other words, when the NOR gate 12 receives a space-absence signal "1" representing there is no storage space from any one of code buffers S1, S2, . . . , and Sn, the NOR gate 12 outputs a read cancel signal "0" to the data storing medium DSM. On the other hand, when the NOR gate 12 receives a space-presence signal representing there is a storage space from any one of the code buffers S1, S2, . . . , and Sn, the NOR gate 12 outputs a read request signal 37 1" to the data storing medium DSM.

Next, with reference to FIG. 10, the operation of the embodiment shown in FIG. 9 will be described. When data is prepared from the data storing medium DSM at the maximum rate thereof and there is no storage space in for example the code buffer S1, the NOR gate 12 receives the space-absence signal "1" from the code buffer S1. At this point, the NOR gate 12 outputs the read stop signal "0" to the data storing medium DSM. Thus, the data reading operation of the data storing medium DSM is stopped. Thereafter, after data is read from the code buffer S1, when the NOR gate 12 receives the space-presence signal "0" from the code buffer S1, the NOR gate 12 outputs the read request signal "1" to the data storing medium DSM. As a result, the reading operation of the data storing medium DSM is resumed. In this manner, the data reading operation of the data storing medium DSM is controlled.

In this construction, it is not necessary to store time information of a header in demultiplexing data which were multiplexed. However, the time information can be stored for use in random access.

In the embodiment just described, the reading control means was constructed of a NOR gate. However, it should be appreciated that a logical circuit having the similar function can be used.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

According to the data multiplexing apparatus of the invention, since a plurality of variable rate data are timeshare-multiplexed in a multiplexed data apparatus of fixed data length, the multiplexing unit can be matched with the physical storing unit of the data storing medium. Thus, the overhead involved in storing control of the data storing medium can be reduced. In addition, when data is reproduced from the data storing medium at random, the waiting time can be reduced. Moreover, data search and intermittent reproduction can be performed at high speeds.

According to the multiplexed data demultiplexing apparatus of the invention, since the data multiplexing apparatus generates the multiplexing unit of fixed data length, even if a device downstream of the multiplexed data demultiplexing apparatus does not read variable rate data which is prepared by the demultiplexing apparatus, since the buffers can store multiplexing unit of fixed data length, no problem will take place.

According to the multiplexed data demultiplexing apparatus of the invention, the original data demultiplexed is stored in buffers having at least the storage capacity of the maximum data length of data which can be generated in a multiplexing interval. In addition, the data is read with a delay corresponding to the multiplexing interval. As a result, the demultiplexing apparatus can have resistance to the fluctuation of delay involved in data generation in the multiplexing interval. Thus, the multiplexing apparatus side does not need to consider such fluctuation of delay.

According to the multiplexed data demultiplexing apparatus of the invention, since the reading operation of the data storing medium is stopped in the case that there is no storage space in a plurality of buffers, it is not necessary to write time information to each pack header as seen in the prior art. In addition, since the apparatus of the present invention does not require a time information storing circuit and a comparator, the apparatus in simple construction can control the reading operation of the data storing medium and demultiplex the original data which were multiplexed. Moreover, as long as there is a storage space in the buffers, the reading operation is continued. Thus, as much data as possible can be prepared from the data storing medium.

What is claimed is:

1. A data multiplexing apparatus for timeshare-multiplexing a plurality of data signals having variable rates, said apparatus comprising:
   a storage medium;
   a plurality of code buffers each respectively receiving one of the data signals;
   switching means responsive to a switching control signal for successively retrieving each of said data signals from said code buffers and for grouping the retrieved data signals so as to form respective packets of data, each packet corresponding to a respective variable rate, and for generating one or more packs of data from the packets of data, each pack having a fixed data length;
   means for determining if the data contained within the one or more packets of data to be included in a respective pack is less than that which may occupy the respective pack and, in the event of such a determination, for obtaining an amount of data necessary to be added to the included data so as to fill the respective pack from a portion of another packet of data and for adding such data to the respective pack;
   header adding means responsive to a header control signal for respectively adding a packet header at a beginning portion of each of said packets and for respectively adding a pack header at a beginning portion of each pack which includes time information identifying when the respective pack of data is to be subsequently read from said storage medium, said header adding means supplying each pack of data to said storage medium so as to be stored therein; and
   control means for generating said switching and header control signals and for respectively supplying the same to said switching means and said header adding means.

2. A method for timeshare-multiplexing a plurality of data signals having variable rates, said method comprising the steps of:
   buffering each of said data signals in respective ones of a plurality of code buffers;
   generating a switching control signal and a header control signal;
   retrieving each of said data signals from said code buffers and grouping the retrieved data signals so as to form respective packets of data each corresponding to a respective variable rate and generating packs of data from the packets of data each having a fixed data length in response to said switching control signal;
   determining if the data contained within the one or more packets of data to be included in a respective pack is less than that which may occupy the respective pack and, in the event of such a determination, for obtaining an amount of data necessary to be added to the included data so as to fill the respective pack from a portion of another packet of data and for adding such data to the respective pack;
   adding, in response to said header control signal, a packet header at a beginning portion of each of said packets and a pack header at a beginning portion of each of said packs including time information; and
   storing each said pack of data in a storage medium;
   said time information identifying when the respective pack of data is to be subsequently read from said storage medium.

3. A multiplexed data storage medium having thereon at least one pack of data formed by timeshare-multiplexing a plurality of data signals having variable data transfer rates associated therewith, each pack having a fixed data length and including a respective pack header signal located at a beginning portion thereof which includes time information signals identifying when the respective pack of data signals is to be subsequently read from said multiplexed data storage medium, each said pack further including at least a portion of one packet of data signals in which each packet corresponds to a respective variable data transfer rate and has a packet header signal located at a beginning portion thereof, said data signals exhibiting any of the data transfer rates up to a maximum transfer rate in response to a request signal and said multiplexed data storage medium having a plurality of storage areas each having a storage capacity which matches said fixed data length of each said pack of data signals.

4. A demultiplexing apparatus for demultiplexing mutiplexed packs of data stored in a storage medium, each pack having a fixed data length and including a respective pack header and one or more packets of data each having a respective packet header and formed by timeshare-multiplexing a plurality of original data signals having variable rates, into said plurality of original data signals, said apparatus comprising:
   means for retrieving said multiplexed packs of data from said storage medium;
   header separating means for separating each said pack header and packet header from the retrieved packs of data;
   pack time information storing means for receiving each separated pack header;

switching means for separating said retrieved packs of data into said plurality of original data signals and for successively supplying the separated original data signals therefrom; and a plurality of buffers each respectively receiving one of said original data signals in succession from said switching means, each of said buffers having a storage capacity at least large enough to accommodate one pack of data having said fixed data length, said buffers supplying said original data signals therefrom.

5. A demultiplexing apparatus according to claim 4, wherein each said pack header includes time information identifying when the respective packet of data is to be retrieved from said storage medium and wherein said pack time information storing means stores the respective time information included in each said pack header.

6. A demultiplexing apparatus according to claim 5, further comprising a system clock for generating a time signal and comparator means for comparing said time information received from said pack time information storing means to said time signal from said system clock and, upon detection of a match therebetween, for generating a read request signal and supplying said read request signal to said storage medium.

7. A demultiplexing apparatus for demultiplexing multiplexed packs of data stored in a storage medium, each pack contained within a respective multiplexing interval having a data length associated therewith and formed by timeshare-multiplexing a plurality of original data signals having variable rates, into said plurality of original data signals, said apparatus comprising:

means for reading said packs of data from said storage medium and for demultiplexing the read packs of data so as to produce said plurality of original data signals therefrom;

a plurality of buffers receiving the produced original data signals from said means for demultiplexing for storing said produced original data signals and for reading the stored original data signals therefrom, each of said buffers having a respective storage capacity at least equivalent to a maximum length of data contained in the multiplexing interval; and delay means for delaying the reading of said stored original data signals by said plurality of buffers by a delay time corresponding to the multiplexing interval.

8. A demultiplexing apparatus according to claim 7, wherein said delay time is obtained by dividing the data length of said multiplexing interval by a rate at which data is transferred from said storage medium.

9. A demultiplexing apparatus according to claim 8, wherein the transfer rate is the maximum rate at which data is transferred from said storage medium.

10. A demultiplexing apparatus according to claim 7, wherein said delay time is a time period associated with said multiplexing interval.

11. A demultiplexing apparatus according to any one of claims 7, to 10, wherein each of said multiplexed packs of data has a fixed length and includes one or more packets of data having respective variable data lengths and wherein each said multiplexing interval is an interval having a length equivalent to said fixed length of said packs of data.

12. A demultiplexing apparatus for demultiplexing a plurality of timeshared-multiplexed data signals stored on a storage medium into a plurality of original data signals, said apparatus comprising:

means for reading said timeshared-multiplexed data signals stored on said storage medium at a predetermined speed and for demultiplexing the read timeshared-multiplexed data signals so as to form a plurality of demultiplexed data signals;

a plurality of buffers each corresponding to one of the original data signals and having a respective storage area, each of said buffers receiving a respective demultiplexed data signal and storing the received respective demultiplexed data signal therein, said plurality of buffers supplying said original data signals therefrom; and control means for temporarily stopping the reading performed by said means for reading when there is an absence of space in the storage area of at least one of said plurality of buffers.

13. A demultiplexing apparatus according to claim 12, wherein said control means includes a logic circuit coupled to each of said buffers and receiving from each of said buffers a signal indicating the absence or presence of space available in the respective storage area and, in response thereto, outputs a read cancel or a read request signal to said means for reading.

* * * * *